US008182872B2

(12) United States Patent
Axisa et al.

(10) Patent No.: US 8,182,872 B2
(45) Date of Patent: May 22, 2012

(54) METHOD OF FABRICATING A POROUS ELASTOMER

(75) Inventors: Fabrice Axisa, Sacierges-Saint-Martin (FR); Pritesh Dagur, Nacka (SE); Jan Vanfleteren, Gentbrugge (BE)

(73) Assignees: IMEC, Leuven (BE); Universiteit Gent, Ghent (BE)

( * ) Notice: Subject to any disclaimer, the term of this patent is extended or adjusted under 35 U.S.C. 154(b) by 394 days.

(21) Appl. No.: 12/563,806

(22) Filed: Sep. 21, 2009

(65) Prior Publication Data

US 2010/0075056 A1 Mar. 25, 2010

Related U.S. Application Data

(60) Provisional application No. 61/100,245, filed on Sep. 25, 2008.

(51) Int. Cl.
*B05D 1/00* (2006.01)
(52) U.S. Cl. .................. 427/294; 427/296; 427/350

(58) Field of Classification Search .................. None
See application file for complete search history.

(56) References Cited

U.S. PATENT DOCUMENTS

| 5,362,761 | A | 11/1994 | Uragami et al. |
| 5,891,470 | A * | 4/1999 | Rinaldi et al. ............... 424/451 |
| 6,900,055 | B1 | 5/2005 | Fuller et al. |
| 7,014,917 | B2 * | 3/2006 | Lyu et al. ..................... 428/447 |

* cited by examiner

*Primary Examiner* — Erma Cameron
(74) *Attorney, Agent, or Firm* — Knobbe Martens Olson & Bear LLP

(57) ABSTRACT

A method is provided for fabricating a porous elastomer, the method comprising the steps of: providing a predetermined amount of a liquid elastomer and a predetermined amount of a porogen; mixing the liquid elastomer and the porogen in vacuum until a homogenous emulsion without phase separation is formed; curing the homogenous emulsion until polymerizations of the emulsion is reached, thereby forming a cured emulsion; and removing the porogen from the cured emulsion. The method can advantageously be used for forming biocompatible porous elastomers and biocompatible porous membranes.

12 Claims, 10 Drawing Sheets

METHOD OF FABRICATING A POROUS ELASTOMER

CROSS-REFERENCE TO RELATED APPLICATION

This application claims the benefit under 35 U.S.C. §119 (e) of U.S. provisional application Ser. No. 61/100,245, filed Sep. 25, 2008, the disclosure of which is hereby expressly incorporated by reference in its entirety and is hereby expressly made a portion of this application.

FIELD OF THE INVENTION

Methods for forming porous materials and porous membranes are provided, more specifically biocompatible porous materials and biocompatible porous membranes, and to porous materials and porous membranes thus obtained.

BACKGROUND OF THE INVENTION

Porous silicones with open or intercommunicating pores are very attractive candidates for forming semi-permeable membranes, e.g., artificial biological membranes, due to the biocompatibility and good mechanical properties (i.e. elasticity and flexibility properties and tolerance to mechanical stretching) of silicones. For application as semi-permeable biological membranes, porous silicones with appropriately sized pores are highly desirable. There is a need for biocompatible membranes with pores that are small enough to prevent living cells from penetrating through the membrane, but large enough to allow diffusion of oxygen and nutrients through the membrane to keep the cells alive. Therefore, there is also a need for a manufacturing process for porous silicones with a controllable pore size and preferably with a limited variation of the pore size over the porous silicone. To allow penetration of cells through a porous membrane, the pores need to be interconnected in a thickness direction of the membrane.

Several attempts have been made to make porous silicones with controllable pore sizes. Various sacrificial fillers (both solids and liquids) can be used as porogens (pore generating agents) for manufacturing porous silicones. For example, U.S. Pat. No. 6,900,055 describes a method for making a porous silicone using solid porogens. When using liquid porogens (such as, e.g., water), a method for making porous silicones involves an intermediate step of preparing a water-in-silicone emulsion. This intermediate step of emulsion formation is challenging, because such emulsion is unstable and water tends to accumulate as a separate layer.

The stability of, e.g., water-in-silicone emulsions can be enhanced by using surfactants or emulsifiers. Both inorganic and organic emulsifiers can be used. Emulsifiers or surfactants reduce the surface tension of a liquid and lower the interfacial tension between two liquids, making an emulsion more stable.

In U.S. Pat. No. 5,362,761 a fabrication method is described wherein a silicone emulsion comprising a water emulsion of an organopolysiloxane, a cross-linking agent, a curing catalyst and an emulsifier is frozen and wherein the ice contained in the frozen silicone emulsion is sublimed (in vacuum) without being defrosted, such that a porous silicone with intercommunicating pores is obtained.

The approaches described in the prior art use at least one emulsifier or emulsifying agent whenever a liquid is used as a porogen. However, the majority of emulsifiers are toxic in varying ranges of concentration, which renders them unsuitable for prolonged contact with living systems. When a solid is used as a porogen, there is often a need for adding dispersing agents to avoid aggregation of micro-particles or nano-particles.

Therefore a complete elimination of emulsifiers and/or dispersing agents from the fabrication process of porous silicones is highly desirable for applications where the porous silicones come in direct contact with living cells or, e.g., with body fluids.

SUMMARY OF THE INVENTION

The preferred embodiments provide a method for fabricating porous elastomers and porous elastomer membranes, such as porous silicones and porous silicone membranes, with a small controlled pore size (depending on the intended application), e.g., with a pore size smaller than 250 micrometer, smaller than 100 micrometer, smaller than 50 micrometer, smaller than 20 micrometer, smaller than 10 micrometer, smaller than 5 micrometer, smaller than 2 micrometer, smaller than 1 micrometer, e.g., down to 0.5 micrometer, wherein the need for using emulsifiers and/or dispersing agents is avoided.

In the context of the preferred embodiments, the pore size is the average of the largest diameter and the smallest diameter of a pore appearing on a cross section of a sample, the diameter being the length of a straight line that passes through the center of the pore and that connects two points on the circumference of the pore cross section. The average pore size of a porous elastomer is the average pore size of a population of pores.

A method of the preferred embodiments can be used for fabricating porous elastomers, e.g., porous silicones, with a specific pore geometry, e.g., with a geometry wherein at least part of the pores are interconnected, wherein the pores show a limited difference between their minimum diameter and their maximum diameter, and/or wherein the variation of the pore diameter over the elastomer is limited. For example, the ratio between the minimum diameter and the maximum diameter of the pores can be in the range between 0.5 and 1 or between 0.6 and 1 or between 0.75 and 1. The variation of the pore size over the elastomer can be lower than 50%, lower than 20% or lower than 10%.

A method is provided for fabricating a porous elastomer comprising the steps of: providing a predetermined amount of a liquid elastomer and a predetermined amount of a porogen; mixing the liquid elastomer and the porogen in vacuum until a homogeneous emulsion without phase separation is formed; curing the homogeneous emulsion until polymerization (solidification) of the elastomer is reached and a cured emulsion comprising a solid elastomer and the porogen is obtained; and removing the porogen form the cured emulsion, thereby forming a porous (solid) elastomer.

It was surprisingly found that, by mixing the porogen and the liquid elastomer in vacuum, the need for using emulsifiers can be avoided.

Furthermore, it was surprisingly found that the method of the preferred embodiments can be used to fabricate porous elastomers with a geometry wherein at least part of the pores are interconnected and wherein the pores show a limited difference between the minimum and maximum diameter within one pore and wherein the variation of the pore diameter over the elastomer is limited.

In preferred embodiments the porogen is a liquid porogen having a lower viscosity than the elastomer. In preferred embodiments the elastomer is a silicone.

In preferred embodiments the elastomer can be a biocompatible material, e.g., a biocompatible silicone, and the porogen can be a biocompatible porogen, such as for example water, deionized water or glycerine. In this context, biocompatibility refers to compatibility with, e.g., living cells and body fluids, i.e., compatibility for implants.

Because the use of emulsifiers and/or dispersing agents is avoided in a method according to the preferred embodiments, the method can be advantageously used to fabricate porous biocompatible membranes, e.g., artificial biological membranes. The method according to the preferred embodiments allows control of the size of the pores in such a way that the pores are small enough to prevent the cells from penetrating through the membrane, but large enough to allow diffusion of oxygen, nutrients, etc. to keep the cells alive. In order to obtain a biocompatible porous membrane, preferably both the porogen and the elastomer are biocompatible materials.

Mixing the liquid elastomer and the porogen in vacuum can comprise mixing at a pressure lower than 500 mBar, lower than 400 mBar, preferably lower than 200 mBar, lower than 150 mBar. The pressure can be between 50 mBar and 500 mBar, or between 50 mBar and 200 mBar, between 100 mBar and 150 mBar, or between 20 mbar and 50 mBar.

Mixing in vacuum may comprise mechanical mixing or stirring, e.g., by means of curved blades in a container. The rotation speed (e.g. of the blades) during mechanical mixing or stirring can be in the range between 30 rpm and 10000 rpm, between 30 rpm and 5000 rpm, between 30 rpm and 2000 rpm, between 30 rpm and 1000 rpm, or between 40 rpm and 600 rpm, or between 50 rpm and 400 rpm or between 80 rpm and 200 rpm, or between 60 rpm and 100 rpm, or, e.g., approximately 100 rpm.

Curing the homogeneous emulsion may comprise heating the homogeneous emulsion, e.g., heating to a curing temperature in the range between 50° C. and 90° C., e.g., to a temperature in the range between 70° C. and 90° C.

Removing the porogen may comprise heating the cured emulsion to the curing temperature or to a temperature that is higher than the curing temperature.

A method of the preferred embodiments may further comprise the step of providing the homogenous emulsion into a mould with a predetermined shape before the curing step, e.g., by pouring or casting the emulsion in a mould or by injection molding. This allows forming porous elastomers with a predetermined shape. In other embodiments embossing techniques may be used for providing a porous elastomer with a predetermined shape.

Alternatively, a method of the preferred embodiments may further comprise providing the homogenous solution on a carrier before the curing step, e.g., by spin coating or doctor blading, e.g., for forming a porous elastomer coating or a porous elastomer membrane.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein. Further, it is understood that this summary is merely an example and is not intended to limit the scope of the invention as claimed. The invention, both as to organization and method of operation, together with features and advantages thereof, may best be understood by reference to the following detailed description when read in conjunction with the accompanying drawings.

DETAILED DESCRIPTION OF THE PREFERRED EMBODIMENTS

Figure 1:
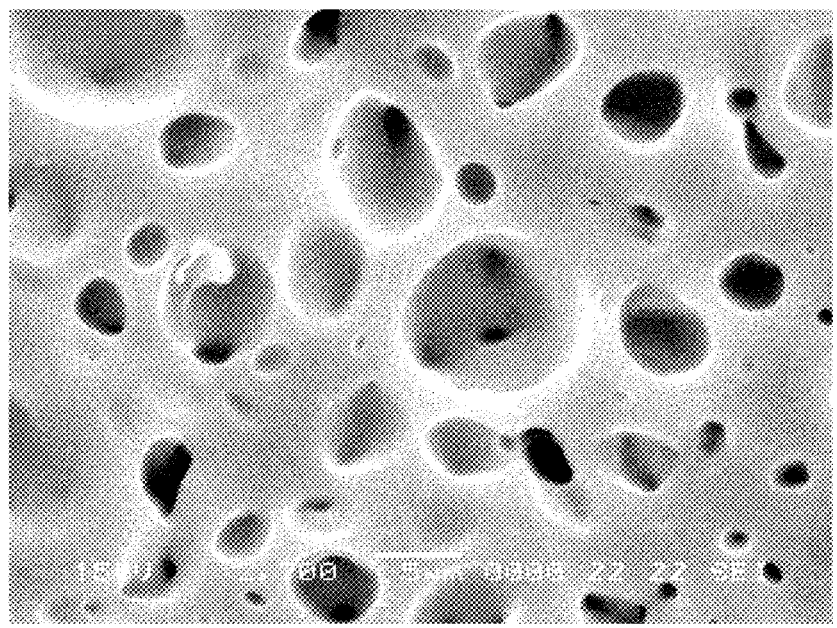
FIG. 1 is a high magnification SEM cross section image of a 33% w/w water in silicone emulsion, cured at 90° C. for 1 hour.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

A method is provided for fabricating porous elastomers and porous elastomer membranes, such as porous silicones and porous silicone membranes, with a small controlled pore size, wherein the need for using emulsifiers (e.g. when using liquid porogens) or dispersing agents (e.g. when using solid porogens) is avoided. This allows fabrication of biocompatible porous elastomers, wherein only a biocompatible porogen such as, e.g., water and a biocompatible elastomer such as, e.g., a biocompatible silicone and no additives apart from (biocompatible) curing agents are used in the fabrication process. More in particular, a method of the preferred embodiments results in porous elastomers, e.g., porous silicones, with a specific pore geometry, i.e., with a geometry wherein at least part of the pores are interconnected, wherein the pores show a limited difference between the minimum diameter and maximum diameter (within one pore) and wherein the variation of the pore diameter over the elastomer is limited. The method of the preferred embodiments allows the fabrication of porous elastomers in a well-controlled way.

In the context of the preferred embodiments, biocompatibility refers to compatibility with, e.g., living cells and body fluids, i.e., compatibility for implants.

Thin porous biocompatible membranes fabricated according to a method of the preferred embodiments can for example advantageously be used in microsystems involving direct interaction with living cells. In this context a membrane thickness in the range between 10 micrometer and 1 mm with cross-sectional pore sizes in the range between 1 micrometer and 10 micrometer, e.g., in the range between 2 micrometer and 5 micrometer can be used. The pores need to be small enough to prevent the cells from penetrating the membrane, but large enough to allow diffusion of oxygen, nutrients, etc. to keep the cells alive. By avoiding the use of emulsifiers and/or dispersing agents, a fully biocompatible membrane is obtained.

Porous biocompatible silicones fabricated according to the preferred embodiments can for example be used as part of implants.

In the context of the preferred embodiments, the pore size is the average of the largest diameter and the smallest diameter of a pore appearing on a cross section, the diameter being the length of a straight line connecting two points on the circumference of the pore cross section that passes through the center of the pore. The average pore size of a porous elastomer is the average pore size of a population of pores.

A method according to the preferred embodiments allows fabricating porous elastomers with a small controlled pore size, e.g., with a pore size smaller than 250 micrometer, smaller than 100 micrometer, smaller than 50 micrometer, smaller than 20 micrometer, smaller than 10 micrometer, smaller than 5 micrometer, smaller than 2 micrometer, smaller than 1 micrometer, e.g., down to 0.5 micrometer.

A porogen is a pore generating agent, i.e., an external agent, a solid or a liquid or a gas used to create pores in a material. In the preferred embodiments, a liquid such as, e.g., water (which is evaporated after solidification of the elastomer) can be used as a porogen. In the preferred embodiments, solids such as, e.g., glucose can be used as a porogen that can be removed after solidification of the elastomer. In preferred embodiments liquid porogens are used because milling (fine powdering) and removal of solid porogens is an intensive process.

A method according to the preferred embodiments comprises the steps of: providing a predetermined amount of a liquid elastomer and a predetermined amount of a porogen; mixing the liquid elastomer and the porogen in vacuum and thus forming a homogeneous emulsion without phase separation; curing the homogeneous emulsion for realizing polymerization (solidification) of the elastomer without removing the porogen, thereby forming a cured emulsion comprising a solid elastomer and the porogen, and removing the porogen from the cured emulsion, thereby forming a porous (solid) elastomer.

In elastomers, such as silicones, polymer chains can be linked together by crosslinks. For example, a liquid polymer (where the chains are freely flowing) can be turned into a "solid" or "gel" by crosslinking the chains together. Crosslinks can be formed by chemical reactions that can be initiated by heat, pressure, radiation or a curing agent, also called cross linking agent. In the latter case, mixing of a non-polymerized or partially polymerized resin with specific chemicals results in a chemical reaction that forms crosslinks (polymerization).

The method is further described for embodiments wherein the elastomers are silicones and wherein the porogens are liquid porogens. However, the preferred embodiments are not limited thereto and the method of the preferred embodiments can also be used with elastomers or elastic polymers other than silicones. When there is a need for a porous elastomer that is biocompatible, a biocompatible elastomer such as silicone or polyurethane and a biocompatible porogen is preferably used. The method of the preferred embodiments can also be used with solid porogens. An advantage of the method of the preferred embodiments is that it eliminates the need for using emulsifiers and/or dispersing agents, such that no traces of an emulsifier or dispersion agent can be found in the final product.

Silicones or polysiloxanes are inorganic-organic polymers having a general chemical formula $[R_2SiO]_n$ where R is an organic group such as, e.g., methyl, ethyl, phenyl, benzyl etc. These materials consist of an inorganic silicon-oxygen (—Si—O—Si—O—) backbone with organic side groups attached to the silicon atoms, which are four-coordinate. Silicones can vary in physical properties depending on the value of n and the nature of R.

In preferred embodiments, as a porogen any liquid or fluid can be used wherein the viscosity of the fluid porogen is lower than the viscosity of the elastomer. Also a solid porogen can be used. When there is a need for a final porous elastomer that is biocompatible, preferably a biocompatible porogen is used, such as for example water or deionized water or glycerine.

The amount of porogen is chosen such that the elastomer/porogen ratio leads to a stable emulsion (e.g. preferably stable during at least 1 hour, without phase separation), especially at atmospheric pressure. The amount of porogen used also influences the porosity of the final product. The lower the percentage of porogen, the lower the porosity of the final product.

Above a certain percentage of porogen (depending on the porogen used), the emulsion is not stable.

Often an elastomer and a liquid porogen are non-miscible under atmospheric pressure without using emulsifiers, especially in case of biocompatible liquid porogens. This is because most biocompatible liquid porogens are water soluble whereas silicones are not.

The preferred embodiments provide a method wherein the need for using emulsifiers is avoided, by mixing the porogen and the elastomer in vacuum. Optionally a curing agent or cross linking agent can be added to the mixture. During mixing in vacuum the porogen can be distributed in different cavities or pores in the elastomer, thereby forming an emulsion. The pressure during mixing can be lower than 500 mBar, lower than 400 mBar, preferably lower than 200 mBar, lower than 150 mBar. The pressure can be between 50 mBar and 500 mBar, or between 50 mBar and 200 mBar, between 100 mBar and 150 mBar, or between 20 mbar and 50 mBar. Preferably mixing in vacuum comprises mechanical mixing or stirring, e.g., with curved blades in a container. In case of mechanical mixing or stirring, the rotation speed of the stirring blades has an influence on the formation of the emulsion and on the properties of the final product (i.e. the solidified or polymerized silicone), e.g., on the pore size in the final product. At higher rotation speeds an emulsion is formed faster and smaller pore sizes can be realized. The rotation speed can be in the range between 30 rpm and 10000 rpm, between 30 rpm and 5000 rpm, between 30 rpm and 2000 rpm, between 30 rpm and 1000 rpm, or between 40 rpm and 600 rpm, or between 50 rpm and 400 rpm or between 80 rpm and 200 rpm, or between 60 rpm and 100 rpm, or, e.g., approximately 100 rpm. Stirring is preferably done until a homogeneous emulsion (without phase separation) forms. This may take for example about 2 minutes to 30 minutes, e.g., 2 minutes to 15 minutes. Formation of an emulsion can be visually detected as it involves a change of the appearance of the silicone/porogen mixture into an opaque white mixture. The mixing time needed for forming an emulsion increases as the percentage of porogen increases. The vacuum mixing allows for the distribution of porogen droplets in cavities dispersed in the elastomer (with optional curing agent) without using an emulsifier. This emulsification is not possible when the mixing is done at the same rotation speeds under atmospheric pressure.

After forming a silicone/porogen emulsion, a curing step is performed (preferably at atmospheric pressure) in order to form a solid silicone with a predetermined shape. Such a predetermined shape can for example be realized by pouring the emulsion into a mould. Due to the stability of the elastomer/porogen mixture, the porogen droplets do not conglomerate immediately after mixing and the porogen droplets at different locations in the emulsion stay separate to a large extent. In preferred cases, the porogen at neighboring locations may touch locally (such that they are interconnected and result in interconnected pores in the final product). Preferably the porogen does not conglomerate into larger droplets (such that the pore size remains limited). Especially when using liquids as porogen, the time between finalizing the emulsion and pouring it into the mould is preferably limited, as porogens tend to coagulate and/or come out of the emulsion. Preferably the time between finalizing the emulsion and pouring it into the mould is lower than 20 min, more preferred lower than 15 minutes, or even more preferred lower than 10 minutes, still more preferred lower than 5 minutes.

Next, the molded emulsion (i.e. emulsion poured in the mould) is cured to achieve polymerization. Optionally a curing agent can react with the elastomer to form cross links, thereby causing hardening (solidification) of the elastomer. The initial elastomer behaves more as a liquid whereas the cured elastomer can behave more as an elastic solid. Preferably, polymerization takes place with the porogen still present in the emulsion. The porogen is removed after the elastomer has polymerized and taken its final shape and structure. In case a liquid is used as a porogen, the porogen can for example be removed by (further) curing or curing at a different temperature. In other cases, for example in case of a solid porogen, the porogen can be evaporated by heating or it can be washed out of the pores. The final porous structure consists of a cured polymer matrix with cavities or pores, which have the shape and size of the porogen, previously present in the emulsion.

The curing time and temperature can be selected depending upon desired features of the process or product. The higher the curing temperature, the faster the polymerization process is. If the curing temperature is low, the curing process is slow, which may allow the porogen to coalesce, leading to larger pores formed in the bulk of the elastomer and in addition the porogen may escape the bulk from all edges. This can lead to edges without pores. The temperature may not be too high, as for example boiling porogen could lead to a vigorous bubbling and evaporation of porogen, leaving large and/or irregular pores in the elastomer matrix. A higher curing temperature may be beneficial as this reduces the time needed for curing and hence prevents the separation of porogen and elastomer. The curing time depends on the viscosity of the elastomer, the amount of porogen in the elastomer, and the annealing temperature. The higher the curing temperature, the shorter the curing time is. Several hours of curing may be needed.

After polymerization, the molded elastomer can be peeled off from the mould. Depending on the shape of the mould, the porous elastomer can be fabricated in different shapes for different purposes or applications.

In an exemplary embodiment wherein silicone is used as an elastomer and wherein water is used as a porogen, silicone can be introduced in a vacuum stirring bowl and a curing agent or cross linking agent can be added to it. The weight ratio of silicone/curing agent can be in the range between 8 and 12 or more preferred between 9.0 and 11.5, or even more preferred between 9.5 and 11, preferably the ratio is around 10. For example, about 10 g of silicone or between 9.8 g and 10.5 g of silicone can be mixed with about 1 g of curing agent or between 0.9 and 1.2 g of curing agent. The curing agents can be many different compounds known to a person skilled in the art, such as Dow Corning SYLGARD 186 Curing Agent. As a porogen, water can be added to the silicone/curing agent mixture. The water can for example be deionized water. The amount of water is preferably chosen such that the silicone/water ratio leads to a stable emulsion. The amount of water in silicone can vary between 5 w % and 90 w %, or between 10 w % and 80 w %, or even better between 10 w % and 70 w % (weight %) water. For example with 70 w % water a stable emulsion can be obtained, depending on the silicone used. The lower the percentage of water, the lower is the resulting porosity in the final product. However, above a certain percentage of water (about 50 w %, e.g., 10 g of water mixed in 10 g of silicone), the water-in-silicone emulsion ceases to be stable during the curing process (e.g. at 90° C.) and water oozes out.

Next the mixture can be stirred in vacuum. At higher speeds the emulsion will be formed faster and smaller pore sizes can be realized. Preferably mixing rotation speeds of 60 rpm and higher can be used. Stirring is done until an opaque white emulsion forms. The vacuum mixing duration increases as the percentage of water is increased. The stirring time can for example be in the range between 5 and 15 minutes or between 5 and 10 minutes. For about 20 w % of water in, e.g., 10 g of silicone, 5 minutes mixing may be sufficient whereas for 50 w % water, 12 minutes of stirring may be needed for the emulsion to form (indicated by opacity of the emulsion). Besides the rotation speed, also the duration of the mixing step and the geometry of the mixing blades used can affect the pore size. The vacuum mixing allows for the formation of a multitude of water droplets, dispersed in the silicone/curing agent mixture. This emulsification may not be possible when the mixing is done under atmospheric pressure as is the case in prior art methods. Under atmospheric pressure, it was found that stirring speeds as high as 2000 rpm were insufficient for the formation of a stable emulsion. Speeds of the order of 15000 to 25000 rpm may be used to prepare the emulsions, maybe in combination with emulsifiers to stabilize the emulsion. Such high stirring speeds are preferably avoided, as they lead to a raise of the temperature such that the silicone starts curing during stirring and as it requires more expensive equipment.

Next, this white emulsion can be poured into a mould. The mould can for example be a glass Petri dish or SU-8 coated silicon mould, Corning Glass, untreated PDMS, or plasma treated PDMS. Preferably pouring of the emulsion into the mould is done quickly (i.e. within a short timeframe) after formation of the emulsion, as the water droplets tend to coagulate upon standing. As the density of the water is higher than the density of the silicone, the water tends to go to the bottom of the mould. The speed of coagulation of water droplets is strongly related to the viscosity of the silicone. Coagulation is slower if the silicone viscosity is higher. For example, the viscosity of the silicone rubber Dow Corning Sylgard 186 during mixing is about 65,000 centipoise. In the case of silicone 50 w % water-in-silicone emulsion (Dow Corning Sylgard 186) after about 15 minutes of standing, a bottom layer of water starts appearing. Therefore, pouring of the emulsion into the mold is preferably done within 20 minutes, or within 15 minutes, or better within 10 minutes after emulsion preparation. Further, at least part of the water droplets preferably touch each other locally (such that they form interconnected pores in the final product), but preferably they do not conglomerate into larger droplets (such that the pore size remains limited).

It was observed that in the porous silicone fabricated as described above a (top) skin layer without pores was formed when the emulsion was allowed to stand for some time before curing. The longer the time between finalizing the emulsion and pouring the emulsion into the mould, the thicker was the skin layer without pores. The thickness of this pore-free layer can be a few tens of micrometers or can be in the range between 20 μm and 100 μm, or between 30 μm and 100 μm, or between 50 μm and 100 μm, or between 70 μm and 100 μm.

In a subsequent step, the molded emulsion (i.e. the silicone/water emulsion poured into the mould) is cured in order to realize polymerization of the silicone and to evaporate subsequently the water such that pores are formed. The curing agent reacts with the silicone elastomer to form cross links, thereby causing hardening (solidification) of the silicone. Without heating the silicone may cure in about 24 hours. In order to reduce that time, heating is preferably used. For example, at 90° C. it may take about 30 minutes for the silicone to cure. Curing of silicones at room temperature may be used in cases where elevated temperatures are undesirable. Preferably silicone polymerization takes place with the water droplets still present. The curing conditions can be chosen such that water evaporation takes place mainly after the silicone has polymerized and taken its final shape and structure. Therefore the final porous structure consists of a cured silicone matrix with cavities, which have the shape and size of the water droplets, previously present in the emulsion. As cured silicone is very permeable to gases, the water droplets can evaporate through the silicone. The curing time and temperature can be selected depending upon desired features of the process or product. Experiments were performed with curing temperatures in the range between 50° C. and 90° C. The higher the curing temperature, the faster the polymerization process is. If a low temperature is used (e.g. lower than 50° C.), the polymerization process is slow, leaving sufficient time for the water droplets to coalesce, leading to larger pores formed in the bulk of the silicone and leading to water droplets escaping from the bulk from all edges. This can therefore lead to edges without pores. In case of a water-in-silicone emulsion the curing temperature can be between 50° C. and 90° C., but preferably close to 90° C. (but not much higher as boiling of the water is undesired). Boiling water (at 100° C. and temperatures close to that) could lead to a vigorous bubbling and evaporation of water, leaving large pores in the silicone matrix. A higher curing temperature may be beneficial as this reduces the time needed for curing and hence, prevents the separation of water and silicone layers. The curing time depends on the viscosity of the silicone, the amount of water in the emulsion, and the annealing or curing temperature. The higher the curing temperature, the shorter the curing time is. Around 90° C., curing can be done for 1 to 2 hours. When curing is done at lower temperatures, 2 to 3 hours of curing can be used; at 50° C., about 3 hours of curing can be used.

After polymerization the cured silicone can be peeled off from the mould. The cured silicone can be easily removed from glass/plastic/SU-8 covered silicon moulds but removing it from PDMS moulds needs retention of an air-gap while molding. Using the air-gap as a starting point, the silicone comes off very easily from the PDMS mould. Depending on the shape of the mould, porous silicone can be fabricated in different shapes for different purposes or applications.

Figure 6:
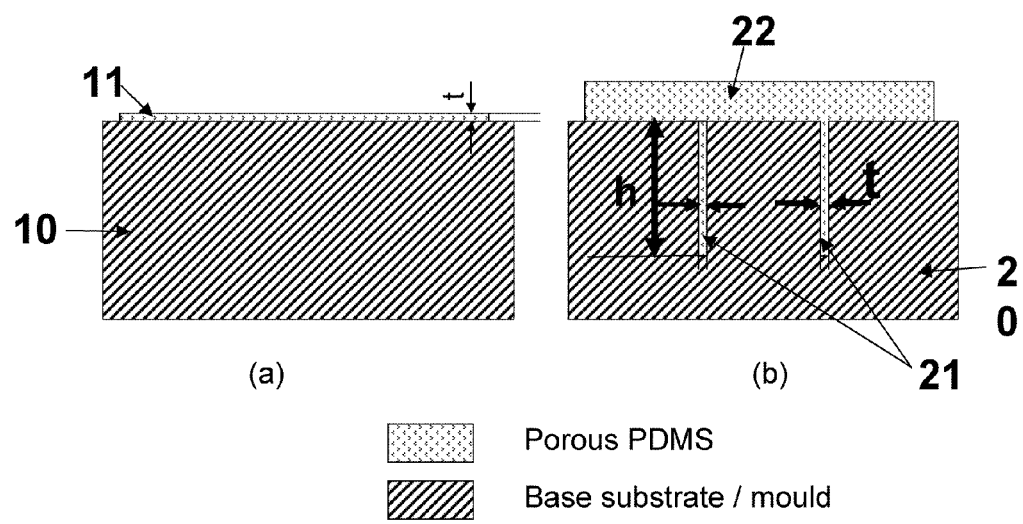
FIGS. 6(a) and 6(b) schematically illustrates methods for the production of porous silicone membranes with thickness t.

FIG. 6 shows two different setups that may be used for producing thin porous silicone membranes with thickness t based on an emulsion prepared according to embodiments of the present invention. In FIG. 6(a), the mould or substrate 10 onto which the liquid emulsion 11 is cast is a simple flat plate. The membrane thickness t is then determined by the thickness of the cast layer 11. In FIG. 6(b), the mould substrate 20 has grooves 21 with width t and height h. The mould material can, e.g., consist of SU8 type photoresist, allowing the fabrication of small grooves 21 with a width t down to 5 micrometer, and large height h, with aspect ratios h/t>10. The layer 22 on top of the mould can be thin or can be relatively thick. The layer on top can be fully porous or can also be fabricated such that there are no pores on the surface. Also another (polymer) layer can be deposited on the top layer, for example as a support layer. When pealing off the porous material from the mould, the resulting structure comprises thin membranes attached to a supporting layer (that can be relatively thick). Using different mould shapes, different geometrical structures can be fabricated. Different membrane shapes with different thicknesses can be prepared. Those membranes can be interconnected or connected to a thicker supporting layer. Besides SU8, any other material allowing making of a mould having high aspect ratio grooves can be used. The grooves can be produced by a suitable method, for example laser ablation, micromachining, or any other method used in the field. Application of the liquid emulsion onto this mould substrate can be done using casting, or vacuum molding, by which process the grooves are completely filled with the emulsion.

As an alternative to molding the emulsion, the emulsion can also be applied by spin coating or doctor blading on a carrier. Alternatively, hot embossing techniques can be used for providing a porous elastomer with a predetermined shape.

The porous material (for example silicone) prepared according to the method of the invention preferably has interconnected pores. Thereby at least part of the pores (between 10% and 30%, between 30% and 50%, between 50% and 70%, between 70% and 90%) can be interconnected or even all pores can be interconnected. The higher the amount of porogen used, the higher the percentage of interconnected pores.

The method of the preferred embodiments can also achieve pores at the edges of the sample such that pores are present throughout the sample and porosity across the full sample thickness is realized. It is also possible to achieve a pore-free top layer, for example with a thickness of a few tens of μm or between 20 μm and 100 μm, or between 30 μm and 100 μm, or between 50 μm and 100 μm, or between 70 μm and 100 μm. Formation of a pore-free layer depends on the difference in viscosity between the porogen and the silicone, the time between emulsion formation and curing and the curing temperature. In experiments performed in the context of the present invention, formation of a pore-free layer was only observed when water was used as a porogen.

For avoiding formation of such a pore-free layer, glycerine and acacia honey were used as a liquid porogen (under otherwise the same processing conditions). Experiments were performed wherein glycerine was used as a porogen with Sylgard 184 silicone. A concentration of 50 w % glycerine in silicone was used. A pore size in the range between 0.5 micrometer and 10 micrometer (measured over three different samples) was observed and no pore-free skin layer was formed. Further experiments were performed using off-the-counter honey as a porogen. Also in this case no pore-free skin layer was present.

Furthermore, the method allows making small pores, i.e., smaller than 250 μm or smaller than 100 μm, or smaller than 50 μm or smaller than 20 μm, or smaller than 10 μm, or smaller than 5 μm, or smaller than 2 μm, or even smaller than 1 μm. The pore size can vary between 100 μm and 250 μm, or between 50 μm and 100 μm, or between 20 μm and 50 μm, or between 10 μm and 20 μm or between 5 μm and 10 μm, or between 1 μm and 5 μm, or between 0.5 μm and 5 μm, or between 1.5 μm and 2.8 μm or between 2.8 μm and 3.2 μm.

The variation of the pore size over the layer can be limited, i.e., lower than 100%, lower than 50%, lower than 20% or even lower than 10%.

The method allows making pores with relatively spherical shape. The ratio of minimum diameter to the maximum diameter can be between 0.75 and 1 or between 0.6 and 1 or between 0.5 and 1.

The method allows fabricating a thin porous membrane, for example with at thickness of 5 μm to 10 μm, or between 1 μm and 5 μm, or between 1 μm and 10 μm. The pores in the membrane can be made smaller than the thickness of the membrane, for example the pores can have a size of 1 μm to 2 μm, or 1 μm to 5 μm, or 2 μm to 5 μm in a membrane with a thickness of for example 6 μm to 10 μm.

Experiments were performed wherein porous silicone was made according to a method of the present invention. In a first step, silicone (~10 g) (Sylgard 186 from Dow Corning) was provided in a vacuum stirring bowl and 1 g of curing agent or cross linking agent was added to it (ratio of silicone:curing agent=10:1). In a second step, an amount of water (10 w % to 50 w % of water) was added to the mixture. In a third step the mixture was stirred in vacuum (pressure ~0.2 Bar, rotation speed between 60 and 100 rpm) until an opaque white emulsion was formed (stirring time varied from 5 to 10 minutes). The vacuum mixing allowed for the formation of a multitude of water droplets, dispersed in the silicone/curing agent mixture. In a forth step, this white emulsion was poured into a mould (glass Petri dish, or SU-8 coated Silicon mould). The thickness of the poured emulsion layer varied from about 2 mm to 8 mm depending on the mould used. Due to the viscosity of the silicone mixture (Dow Corning 186=65'000 centipoise) the water droplets did not conglomerate immediately and stayed separate to a large extent. In a fifth step, the molded silicone was cured at 90° C. for 1 to 2 hours. Silicone polymerization took place with water droplets still present as an emulsion. Water evaporation occurred mainly after the silicone had polymerized and taken its final shape and structure. Finally the molded silicone was peeled off from the mould.

Figure 2:
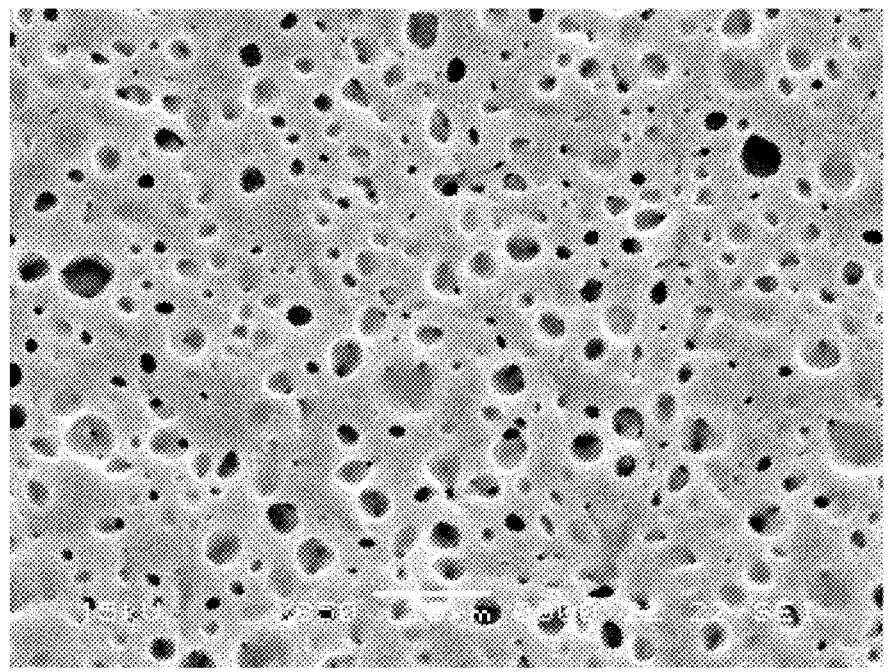
FIG. 2 shows a low magnification SEM cross section image of a 33% w/w water in silicone emulsion, cured at 90° C. for 1 hour, illustrating the uniformity of pores throughout the sample.
Figure 3:
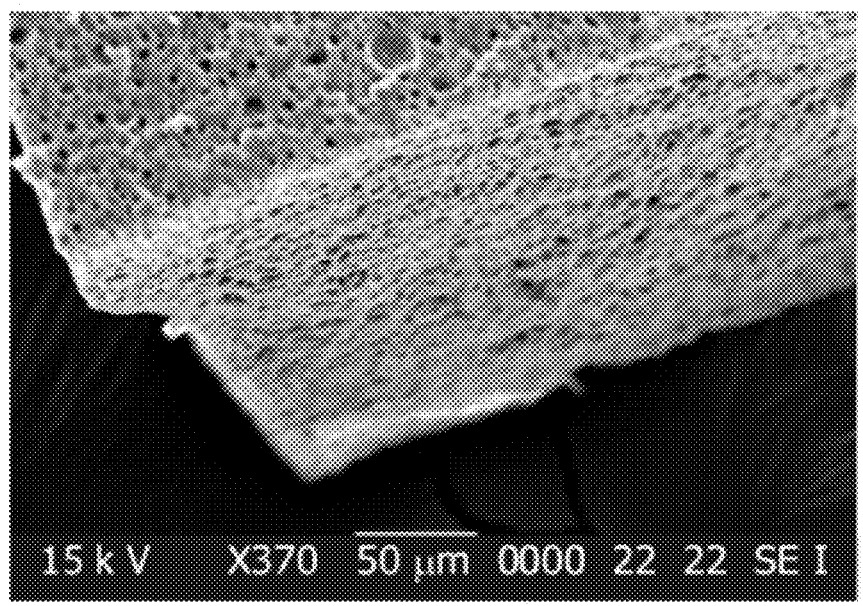
FIG. 3 provides a SEM image of the edge of a 33% w/w water in silicone emulsion, cured at 90° C. for 1 hour, illustrating the uniformity of pores throughout the sample.

Scanning electron microscopy (SEM) images of the resulting porous silicone structures are shown in FIGS. 1, 2, and 3 for a sample fabricated using 33% w/w (weight-by-weight ratio or ratio of weights) water in silicone, wherein the emulsion was stirred in vacuum for 5 minutes prior to molding. FIG. 1 shows a high magnification image, clearly showing interconnected cells. FIG. 2 shows an image with a lower magnification image showing the "sponge"-like structure of the silicone. FIG. 3 shows a view of the edge of the sample, highlighting the presence of pores throughout the sample.

Figure 4:
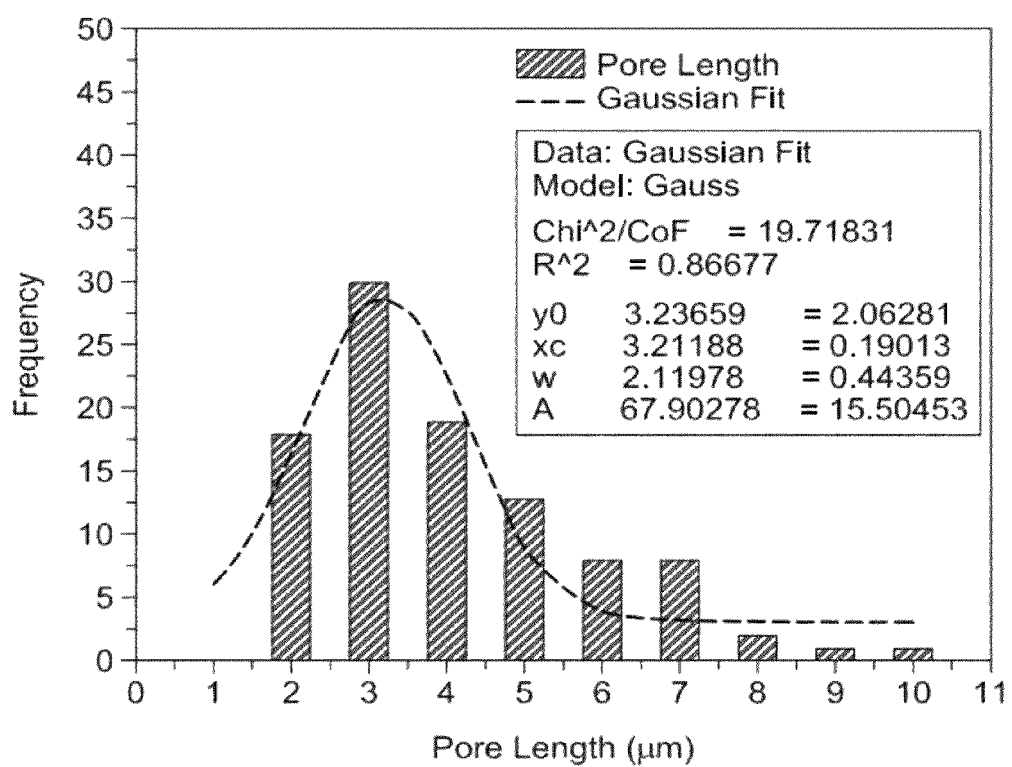
FIG. 4 illustrates the pore length distribution for a 33% w/w water in silicone emulsion, cured at 90° C. for 1 hour. The average pore length is 3.2 μm.
Figure 5:
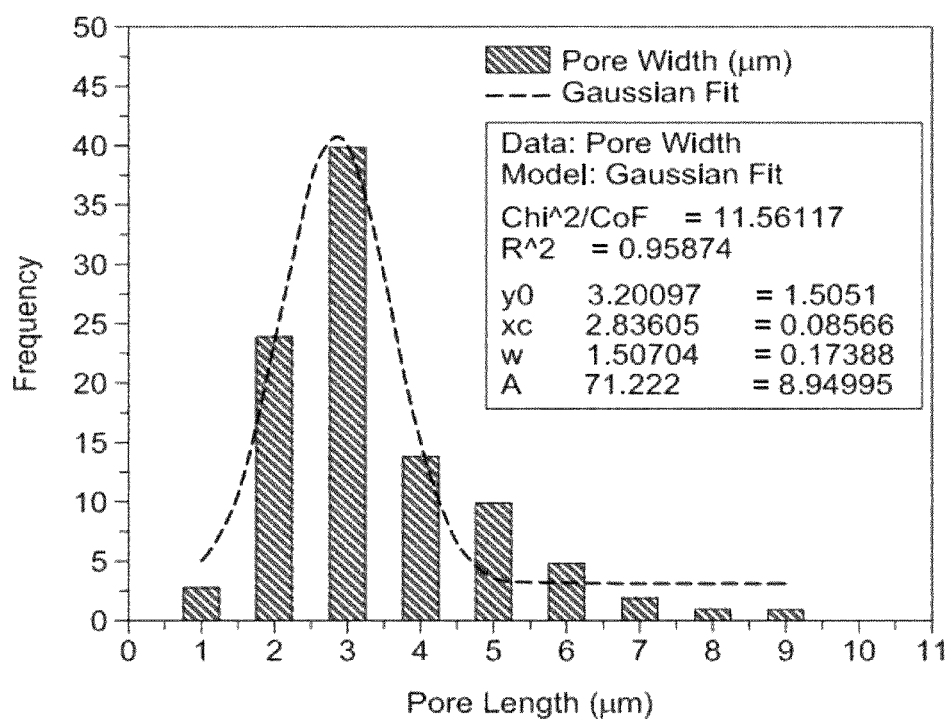
FIG. 5 illustrates the pore width distribution for 33% w/w water in silicone emulsion, cured at 90° C. for 1 hour. The average pore width is 2.8 μm.

A statistical analysis of the pore sizes is presented in FIGS. 4 and 5. FIGS. 4 and 5 show the pore length and width distribution respectively for the sample mentioned above, based on an analysis of a SEM cross section (manually marking the pore sizes and statistical evaluation by software). The average pore length and width are found to be 3.2 and 2.8 microns, respectively.

Figure 7:
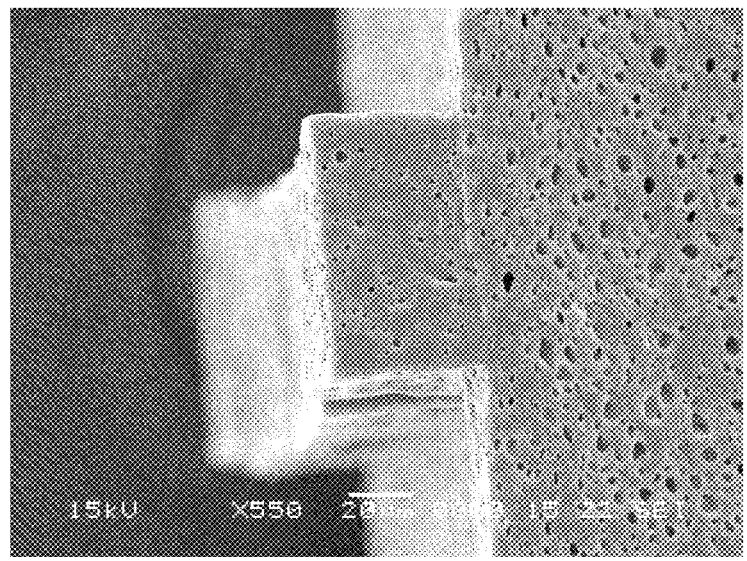
FIG. 7 shows a SEM picture of a porous silicone layer, produced according to the method illustrated in FIG. 6(b).

A thin porous silicone membrane was fabricated according to a method of the present invention, using a PDMS/water emulsion and using a mould as shown in FIG. 6(*b*). The mould material was SU8 type photoresist with grooves with a width t of 80 micron, and height h of 40 micron. The aspect ratio h/t is therefore about 0.5. The grooves were produced by lithography of SU8 photoresist on a silicon (Si) substrate. The liquid PDMS/water emulsion was applied onto this mould by casting. FIG. 7 shows a SEM picture of the resulting structure after polymerization and release from the mould. The structure in FIG. 7 is rotated 90 degrees clockwise, compared to FIG. 6(*b*). It shows a structured porous silicone, where pores are present also in the smaller features (in the silicone bump type structures in the middle of the photograph). This indicates that during casting small water droplets have entered the grooves in the silicon/SU8 mould.

As an alternative to Sylgard 184, which is a low viscosity non-biocompatible silicone (in case of contact with body fluids), porous silicones were prepared using MDX Silastic 4-4210 (a silicone that is biocompatible for implants). Due to the high viscosity of MDX silicone, the water-silicone and glycerine-silicone mixtures (with 30-50 w % water/glycerine in silicone, by weight) were found to be non-homogeneous (i.e. there was no homogeneous emulsion formation). Therefore, to achieve a homogenous emulsion, Silastic was diluted with Dow Corning 360 Medical Fluid (100 cSt viscosity). Dilutions between 10 and 70 w % were tried but the optimum mechanical strength was observed at 40 w % substitution. Experiments were performed comprising the following steps: homogenization of Silastic and Medical Fluid (the two are soluble); addition of porogen (glycerine or honey) to the silastic/medical fluid mixture; vacuum mixing with a high speed vacuum mixer (455 rpm) for times varying between 2 minutes and 12 minutes; casting into a mould; and curing at 90° C. for 30 minutes. It was found that 8.5 min of mixing is sufficient for Silastic+40 w % Medical Fluid+50 w % glycerine/honey to form a homogeneous emulsion.

As an alternative for pouring the emulsion into a mould, the emulsion can be applied, e.g., by spin coating, e.g., on a rigid carrier (e.g. alumina plate, silicon wafer) or a flexible carrier (e.g. polymer carrier). This allows the realization of very thin coatings and of very thin membranes, e.g., membranes with a thickness down to 10 micrometer or even thinner. Experiments were performed wherein an emulsion was spin coated on a silicon substrate with spin speeds in the range between 500 rpm and 8000 rpm. The resulting membrane thickness was about 50 micrometer for a 3000 rpm spin speed, about 38 micrometer for a 4000 rpm spin speed and about 9 micrometer for a 8000 rpm spin speed. Electron microscopy images and cross section images reveal that the membranes are porous all through. It was also observed that membranes spun at spin speeds lower than 3000 rpm show an uneven surface.

Figure 8:
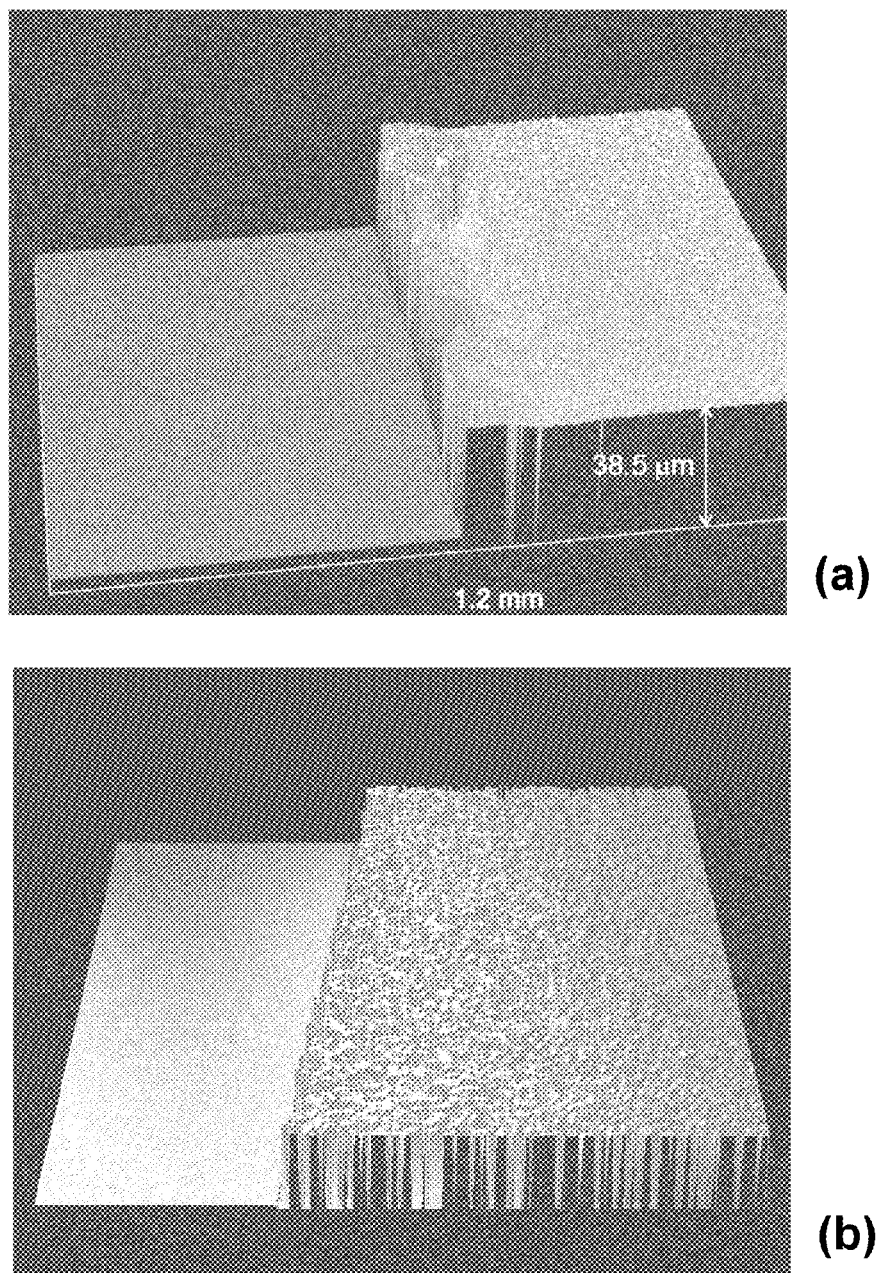
FIGS. 8(a) and 8(b) show optical profilometry images of silicone membranes formed according to embodiments of the present invention by spin coating an emulsion on a silicon wafer for two different spinning speeds.
Figure 9:
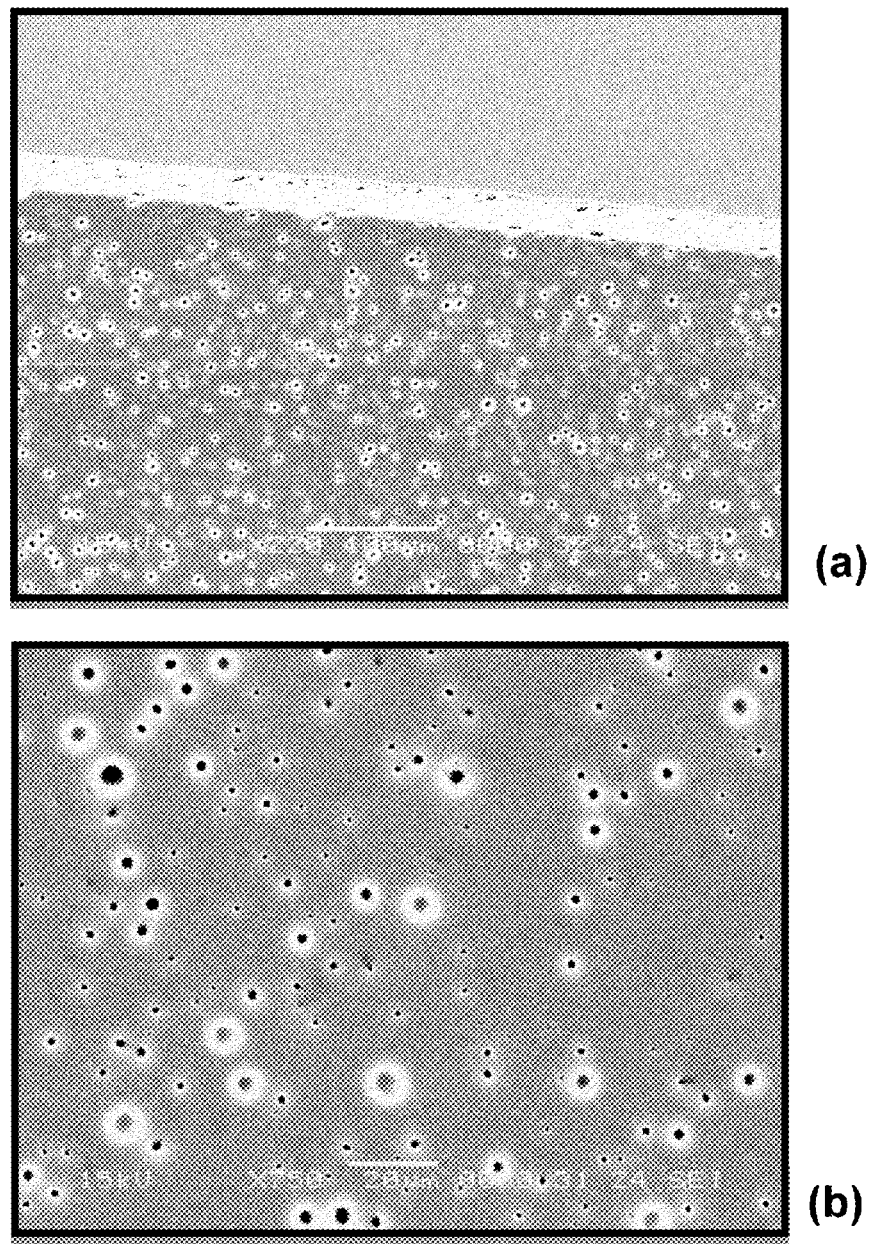
FIGS. 9(a) and 9(b) show SEM images of a silicone membrane formed according to an embodiment of the present invention by spin coating an emulsion on a silicon wafer: (a) cross section, and (b) top view.

FIG. 8 shows optical profilometry images for porous silicone membranes fabricated according to a method of the present invention. FIG. 8(a) shows a membrane obtained by mixing of 10 g Silastic MDX 4-4210, 5 g glycerine and 4 g Medical Fluid, vacuum stirring for 8.5 minutes, spreading spin (to homogenously spread the emulsion on the carrier before actual spinning at higher speed) of 500 rpm for 10 s and spinning on a silicon wafer at 4000 rpm (to form a thinner emulsion layer) for 30 seconds, and finally curing at 90° C. for 15 minutes. The resulting membrane thickness is 38.5 micrometer. FIG. 8(b) shows a membrane obtained with the same conditions, except for the spinning on the silicon wafer, which was performed at 3000 rpm for 30 seconds. This resulted in a membrane thickness of 51.3 micrometer. FIGS. 9(a) and 9(b) show scanning electron images of this 51.3 micrometer thick membrane. It can be concluded that membranes with a uniform thickness and with pores throughout the material (i.e. without a pore-free skin layer) can be formed.

Figure 10:
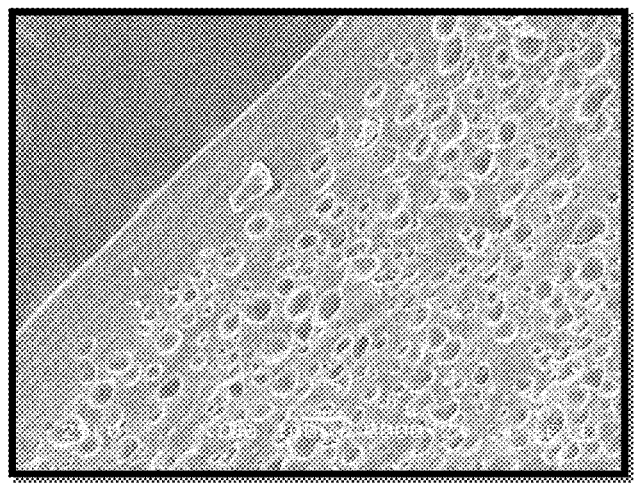
FIGS. 10(a), 10(b), and 10(c) shows SEM images of porous silicones fabricated according to various embodiments, using different porogens: (a) water; (b) glycerine and (c) acacia honey.
Figure 10:
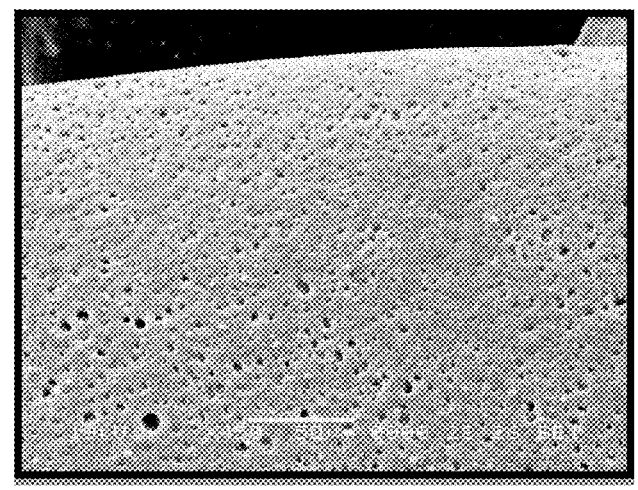
Figure 10:
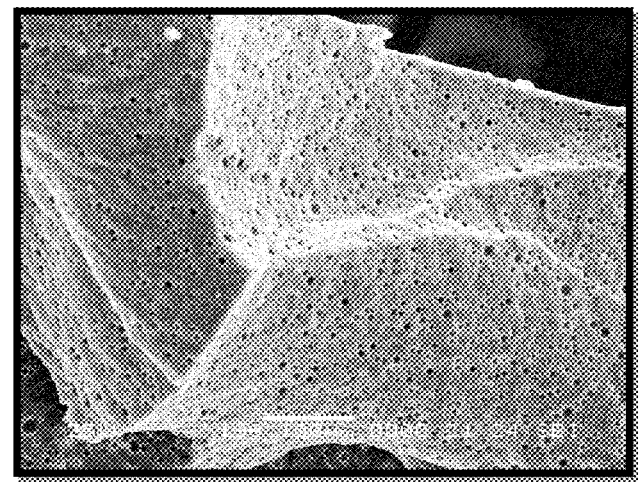

FIG. 10 shows scanning electron microscopy images of porous silicone obtained by a method according to the present invention, wherein different porogens were used. For fabricating the porous silicon, a mixture of 10 g Silastic MDX 4-4210, 5 g of porogen and 4 g Medical Fluid was stirred in vacuum for 8.5 minutes, spin coated on a rigid carrier and cured at 90° C. for 15 minutes. For fabricating the porous silicone shown in FIG. 10(a), water was used as a porogen. The porous silicone shown in FIG. 10(b) was obtained using glycerine as a porogen and the porous silicon shown in FIG. 10(c) was obtained using acacia honey as a porogen. Only when using water as a porogen (FIG. 10(a)) a pore-free skin layer is formed. When using glycerine or acacia honey as a porogen, pores are formed throughout the material.

These experiments illustrate that the preparation of thin membranes, in the range of thicknesses and pore sizes needed for use as artificial biological membranes can be prepared using spin coating.

In alternative embodiments the silicone-glycerine emulsion can also be patterned using hot embossing, down to feature sizes 10×10 micrometers without breaking.

What is claimed is:

1. A method for fabricating a porous elastomer, the method comprising:
   providing a predetermined amount of a liquid elastomer and a predetermined amount of a porogen;
   combining the liquid elastomer and the porogen in vacuum;
   mixing the combined liquid elastomer and porogen in vacuum and in an absence of emulsifiers and dispersing agents until a homogenous emulsion without phase separation is formed;
   curing the homogenous emulsion until polymerization of the emulsion is reached, thereby forming a cured emulsion; and
   removing the porogen from the cured emulsion.

2. The method of claim 1, wherein the porogen is a liquid porogen having a viscosity that is lower than a viscosity of the liquid elastomer.

3. The method of claim 1, wherein the elastomer is a biocompatible elastomer and wherein the porogen is a biocompatible porogen.

4. The method of claim 1, wherein the elastomer is a silicone.

5. The method of claim 1, wherein the porogen is selected from the group consisting of water, deionized water, glycerine, and combinations thereof.

6. The method of claim 1, wherein mixing the combined liquid elastomer and porogen in vacuum comprises mixing at a pressure of from 50 mBar to 500 mBar.

7. The method of claim 1, wherein mixing the liquid elastomer and the porogen in vacuum comprises mechanical stirring with blades, at a blade rotation speed of from 40 rpm to 600 rpm.

8. The method of claim 1, wherein curing the homogeneous emulsion comprises heating the emulsion to a temperature of from 50° C. to 90° C.

9. The method of claim 1, further comprising coating the homogenous emulsion on a carrier by spin coating or doctor blading, before curing the emulsion.

10. The method of claim 1, wherein the homogenous emulsion consists essentially of the liquid elastomer and the liquid porogen.

11. The method of claim 1, wherein the homogenous emulsion consists of the liquid elastomer and the liquid porogen.

12. The method of claim 1, wherein the cured emulsion is biocompatible.

* * * * *